United States Patent [19]
Abe

[11] Patent Number: 5,738,146
[45] Date of Patent: Apr. 14, 1998

[54] METHOD FOR REHABILITATION OF UNDERGROUND PIPING

[75] Inventor: Kaoru Abe, Kawabe-gun, Japan

[73] Assignee: Sekishin Sangyo Co., Ltd., Itami, Japan

[21] Appl. No.: 800,282

[22] Filed: Feb. 13, 1997

[30] Foreign Application Priority Data

Feb. 16, 1996 [JP] Japan .................. 8-053821

[51] Int. Cl.⁶ .................................. F16L 55/162
[52] U.S. Cl. .................. 138/97; 138/112; 138/120
[58] Field of Search .................. 138/97, 112, 114, 138/120

[56] References Cited

U.S. PATENT DOCUMENTS

| | | | |
|---|---|---|---|
| 1,476,830 | 12/1923 | Newell | 138/120 |
| 1,481,149 | 1/1924 | Quinn | 138/97 |
| 2,696,264 | 12/1954 | Colmerauer et al. | 138/120 |
| 3,813,477 | 5/1974 | Fischer | 138/120 |
| 4,848,407 | 7/1989 | Smith et al. | 138/97 |
| 4,954,016 | 9/1990 | Storgard | 138/97 |
| 4,958,959 | 9/1990 | St. Onge | 138/97 |
| 5,033,512 | 7/1991 | Abbema | 138/97 |
| 5,635,675 | 6/1997 | Houga | 138/120 |

Primary Examiner—David Scherbel
Assistant Examiner—James F. Hook
Attorney, Agent, or Firm—Wenderoth, Lind & Ponack

[57] ABSTRACT

In rehabilitating underground piping, a new piping is installed by inserting a large number of unit pipes into the existing underground piping. Each of the unit pipes has a prescribed length and is connected to an adjacent unit pipe along a longitudinal direction. The unit pipe is tapered, and the tapered pipes are inserted from one of two adjoining manholes with the smaller-diameter ends directed toward the other manhole. The smaller-diameter end of the next tapered pipe is inserted into the larger-diameter end of the preceding pipe. A seal is formed at the connection by wrapping a packing made of hydrophilic rubber around the smaller-diameter end. This operation is repeated until the leading tapered pipe reaches the other manhole.

4 Claims, 1 Drawing Sheet

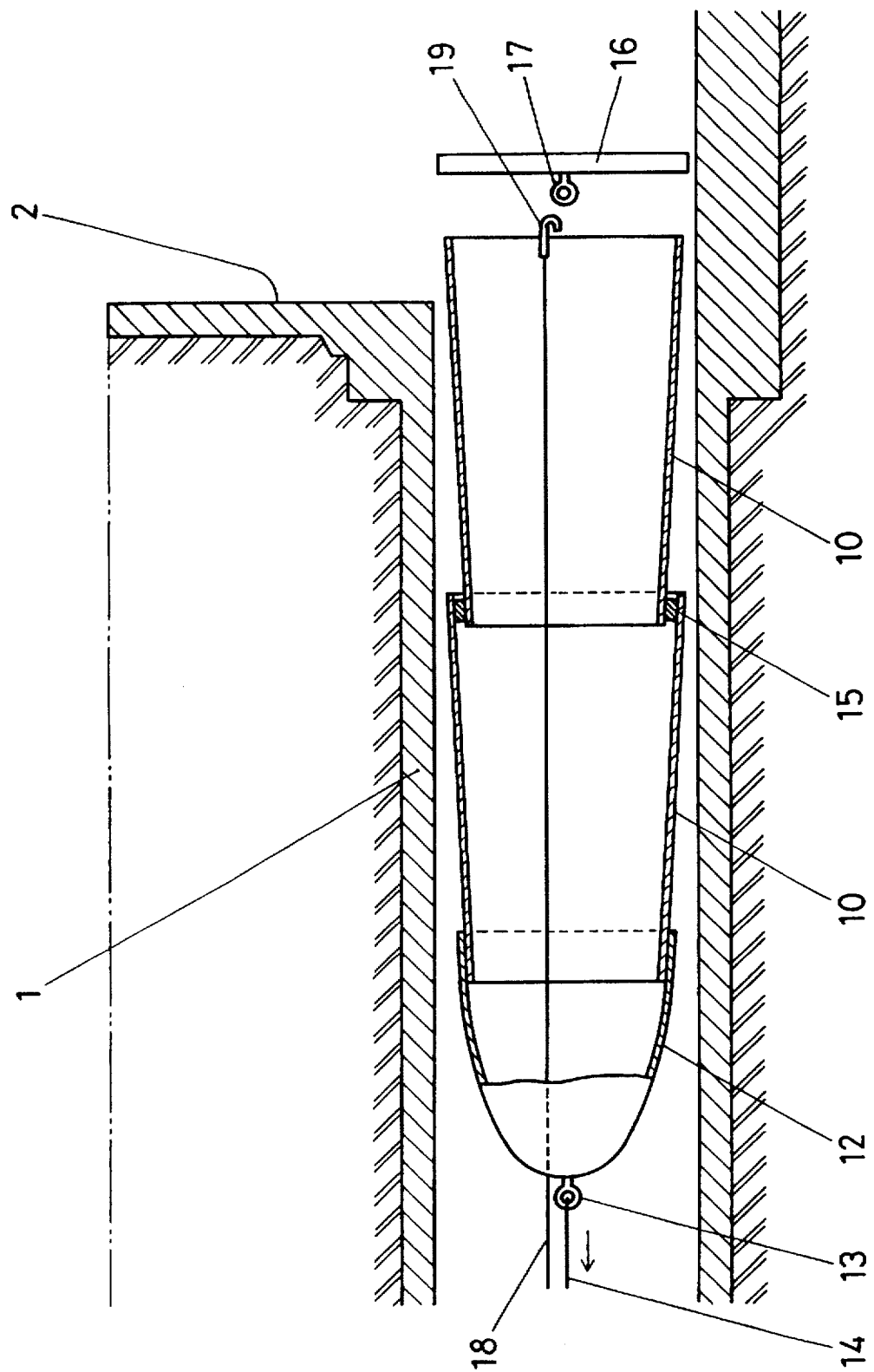

METHOD FOR REHABILITATION OF UNDERGROUND PIPING

BACKGROUND OF THE INVENTION

The present invention concerns a method of rehabilitating piping which is buried under the ground and is damaged by the formation of cracks etc., more specifically, a method of installing new piping inside existing underground piping such as sewer piping so as to restore the function of the piping. The method is particularly suitable for the rehabilitation of pipes in small or limited places where entry by a person is practically impossible.

As a method for rehabilitating piping in cases of the occurrence of damage such as cracks, etc. to service water, sewer, agricultural water, industrial water or gas pipes located in places, where the ability of a person to enter is practically impossible, a method is known which consists of inserting plastic pipe provided with a socket into the existing pipe through a manhole, pushing in the first pipe with a second plastic pipe by fitting the tip of the second pipe in the socket and making the plastic pipe at the head reach an adjoining manhole by repeating this operation.

However, the above-mentioned method of pushing in plastic pipes provided with a large-diameter socket formed at one end of an untapered parallel pipe body, involves larger space or volume loss of the existing piping in comparison to cases of pipes without sockets. Also, in cases where the existing pipe is curved, additional problems are presented such as the impossibility of pushing due to disengagement of the joint at the socket, and the impossibility of providing a waterproof joint at the socket, etc.

SUMMARY OF THE INVENTION

The present invention makes it possible, in the above-mentioned method of rehabilitating underground piping by installing new pipes inside the existing damaged underground pipes, to reduce the loss of effective space or volume of the existing piping and also to cope with cases in which the existing pipe is curved.

The method for rehabilitating underground piping according to the present invention includes installing a large number of unit pipes of prescribed length. The unit pipes are more slender than the damaged underground pipes and are inserted by connecting them along a longitudinal direction. Also, the unit pipes are tapered. Initially, one of the tapered pipes is inserted into the existing piping from one of two adjoining manholes toward the other manhole with the smaller-diameter end at the head or leading end. The smaller-diameter end of the next tapered pipe is inserted into the larger-diameter end of the preceding pipe and includes a packing formed of rubber material wrapped around the smaller-diameter end. This operation is repeated until the head of the first tapered pipe reaches the other manhole.

The unit pipe used in the present invention may be manufactured from stainless steel or plastic (vinyl chloride, for example), FRP, etc. but shall preferably be made of stainless steel due to its excellent strength and the possibility of thickness reduction. The length and the outside diameter of the unit pipe can be set as required depending on the degree of curving and the inside diameter of the existing underground piping. Also, with both stainless steel and plastic, 10 mm will be enough of a difference between the outside diameter of the larger-diameter end of the unit pipe and the inside diameter of the existing pipe. Also, the taper shall preferably be such that the length of the joint part may be around 40 to 60 mm. For example, when the inside diameter of the existing piping is 250 mm, it is desirable to have 500 to 700 mm as length, 230 to 240 mm as the outside diameter of the larger-diameter end, 1.0 to 3.0 mm of thickness, and $1/70$ to $1/50$ as taper respectively, of tapered pipe made of stainless steel. Moreover, in the case of tapered pipe made of plastic, it is desirable to have 500 to 700 mm as the length, 230 to 240 mm as the outside diameter of the larger-diameter end, 5 to 9 mm in thickness, and $1/70$ to $1/50$ as the taper, respectively.

The tapered pipe, which is inserted by being pushed in from one of two adjoining manholes toward the other manhole, shall preferably be provided with a tapered cap, in the form of a cone, bowl, shell, spindle, etc., at the tip of the tapered pipe at the head, to prevent the tapered pipe at the head from being hooked by the upper and lower sections of the inner face of the existing pipe at the time of the insertion. Also, when the second and subsequent tapered pipes are inserted, a packing made of a rubber material is wound around the tips of the pipes. The rubber material swells with the absorption of water and is intended to seal the joints of two adjacent tapered pipes when it swells by absorbing water. The rubber material is manufactured by mixing water absorptive resin in rubber or furnishing the rubber with a hydrophilic property through a chemical reaction.

Furthermore, the pushing in of the tapered pipes can be made more smooth by pulling the cap with a wire or other rope-like material from the other manhole, pulling the tapered pipe from the other manhole by attaching an end plate to the tapered pipe at a rear end thereof or by combining these two methods. When the installation of the tapered pipe is finished, cement mortar is poured, according to the normal method, between this newly installed piping consisting of tapered pipes and the existing piping, to fix the new piping.

In the present invention, which uses tapered pipes, the manufacture of pipes is easier compared with that of conventional socket pipes. Moreover, because tapered pipes are put together by fitting the smaller-diameter end of one with the large-diameter end of the other, it becomes possible to set the larger-diameter end of the tapered pipes at a size no smaller than the socket diameter of the conventional socket pipe, thus increasing the effective diameter of the newly installed piping and reducing the space or volume loss of the existing piping. And, because the tapered pipes are connected to each other by means of the fitting, the axial line of one end of the taper can be bent against the other side by keeping the fitting shallow, and this makes it possible to perform renewal by inserting tapered pipe without difficultly, even in cases where the existing pipe is curved.

As described above, the present invention is applicable even in cases where the damaged existing underground pipes are small, with an inside diameter of 600 mm, or where entry of a person is impossible. The present invention increases the utilization ratio of the inside space of the existing pipes and also facilitates renewal even in cases where curved piping exists.

BRIEF DESCRIPTION OF THE DRAWINGS

FIG. 1 is a sectional view of an embodiment of the present invention and shows a manhole and a portion of an existing underground pipe.

DETAILED DESCRIPTION OF THE INVENTION

Embodiments of the method for rehabilitation of underground piping of the present invention will be explained hereafter based on the drawing.

(Embodiment 1)

In FIG. 1, 1 is an existing pipe buried under the ground, and both ends of the existing pipe 1 are open around the bottom of a manhole 2. A large number of tapered pipes 10 are pushed into one end of the existing piping 1 from the manhole 2 indicated in the drawing. The tapered pipes are inserted one by one, toward the other manhole (not shown). The tapered pipes 10 are conical and have a taper of 1/50 to 1/70. The smaller-diameter or leading end of the first tapered pipe is provided with a cap 12 in the shape of a rotary elliptical body split into two parts which are fastened by means of a plurality of screws (not shown). The cap 12 is made of either stainless steel or plastic, and an eyebolt 13 is provided at its tip. A wire 14 is connected to the eyebolt. The wire 14 is inserted in advance through the entire length of the existing pipe 1.

A second tapered pipe and subsequent tapered pipes 10 are inserted in the larger-diameter rear end of the preceding tapered pipes 10, and are inserted inside the existing piping 1 as the cap 12 at the head or leading end is pulled by means of the wire 14 from the side of the other manhole in concert with the pushing in of the subsequent tapered pipes 10 from the side of the first manhole. An annular or band-like packing 15 is provided between an interior surface of the trailing end of the first tapered pipe and an exterior surface of the leading end of the subsequent tapered pipe. And, as the cap 12 at the head reaches the other manhole with the repetition of the above-mentioned operation, the cap 12 is detached, and cement mortar is poured between the newly installed piping consisting of the large number of tapered pipes 10 and the existing piping 1 to fix in place the new piping.

The packing 15 is formed of a material which expands or grows when exposed to water. The hydrophilic packing 15 can be formed by mixing rubber and water absorptive resin.

(Embodiment 2)

An end plate 16 having a diameter, which is slightly larger than the larger-diameter end of the tapered pipe 10, is provided in the manhole 2 of the first Embodiment. An eyebolt 17 is fixed at the center of the end plate 16. In addition, a hole is drilled at the tip of cap 12 adjacent to the eyebolt 13, and a second wire 18 ranging over the entire length of the existing piping 1 is inserted through this hole in the same way as wire 14. The other end of the second wire 18 is fastened a hook 19. And, when any optional one of the second or subsequent tapered pipes 10 are pushed in, the hook 19 is secured on the eyebolt 17 of the end plate 16 in order to attach the end plate 16 to the larger-diameter end of the subsequent tapered pipe 10 and, simultaneously, as the wire 14 is pulled from the other manhole, the second wire 18 is also pulled. The hook 19 is attached and detached each time one of the tapered pipes 10 is added to form the new piping throughout the entire length of the existing piping 1. The winding or installation of packing 15, around the smaller-diameter end of the tapered pipe 10, and the pouring of cement mortar after the installation are performed in the same way as in the first Embodiment. The diameter of the end plate 16 may be formed in a flexible way to allow free expansion and shrinkage, while the attachment and detachment of the second wire 18 may be omitted.

The second Embodiment of the method of rehabilitating an underground pipe according to the present invention will be described more concretely hereafter.

EXAMPLE 1

In the Embodiment shown in of FIG. 1, the tapered pipes 10 were manufactured and installed with dimensions of the outside diameter of the larger-diameter end at 240 mm, the outside diameter of the smaller-diameter end at 230 mm, a thickness of 1.5 mm and a length of 600 mm (taper 1/60) against the existing piping 1 with an inside diameter of 250 mm. At the joints between adjacent tapered pipes, a band-like packing was inserted. The packing has a thickness of 3 mm and a width of 30 mm and is formed of a material which grows or expands when exposed to water. ("Best Seal" by CRK Company). In this case, the thickness dimension of the joint at the front and rear parts of the tapered pipe 10 became approximately 50 mm, and the effective length was 500 mm. The inside diameter ratio of the smaller-diameter end of the tapered pipe 10 to the existing piping was 90.8% and the surface area ratio was 82.4%.

EXAMPLE 2

In a second example, the taper was increased to 1/50 and the outside diameter of the smaller-diameter end was reduced to 225 mm without any change in the length, the outside diameter of the larger-diameter end, or the thickness of the tapered pipe 10. In this case, the inside diameter ratio and the surface area ratio of the smaller-diameter end of the tapered pipe 10 to the existing piping became 90.0% and 81.0%, respectively.

EXAMPLE 3

In a third example, the outside diameter of the larger-diameter end, the outside diameter of the smaller-diameter end and the taper were set at the same dimensions as those in Example 1, except that the tapered pipes 10 were made of vinyl chloride and their thickness was changed to 5 mm. In this case, the inside diameter ratio and the surface area ratio of the smaller-diameter end of the tapered pipe 10 to the existing piping became 88.0% and 77.4%, respectively.

On the other hand, with conventional socket pipes made of plastic, which have a difference of approximately 20 mm between the outside diameter of the pipe body and the outside diameter of the socket, and a thickness of pipe body of approximately 5 mm, the inside diameter of the pipe body becomes 210 mm if the outside diameter of the socket is set equal to the outside diameter of the larger-diameter end of 240 mm of the tapered pipe 10, and the inside diameter ratio and the surface area ratio to the existing piping comes to 84.0% and 70.1%, respectively.

What is claimed is:

1. A method of rehabilitating existing underground piping extending between a first manhole and a second manhole, the method comprising:

inserting a first unit pipe into the existing underground piping from the first manhole in a direction toward the second manhole, wherein said first unit pipe comprises a tapered pipe having a diameter which gradually increases from a leading end to a trailing end without a stepped portion for a joint being formed along the entire length of said first unit pipe;

wrapping a packing material on a smaller diameter leading end of a second unit pipe, wherein said packing material comprises a rubber material which swells upon absorption of water, and said second unit pipe comprises a tapered pipe having a diameter which gradually increases from said smaller diameter leading end to a larger diameter trailing end without a stepped portion for a joint being formed along the entire length of said second unit pipe;

inserting said second unit pipe into the existing underground piping from the first manhole such that said leading end of said second unit pipe is inserted into said trailing larger diameter end of said first unit pipe; and repeatedly inserting subsequent, unit pipes into the existing underground piping from the first manhole until said first unit pipe reaches the second manhole such that said first, second, and subsequent pipes form a new piping inside of the existing underground piping, wherein each of said subsequent unit pipes includes said packing and comprises a tapered pipe halving a diameter which gradually increases from a smaller diameter leading end to a larger diameter trailing end without a stepped portion for a joint being formed along the entire length of said subsequent unit pipes.

2. The method of rehabilitating existing underground piping as claimed in claim 1, further comprising injecting cement mortar between an interior peripheral surface of the existing underground piping and an exterior peripheral surface of said new piping.

3. The method, of rehabilitating existing underground piping as claimed in claim 1, further comprising attaching a tapered cap at said leading end of said first unit pipe.

4. The method of rehabilitating existing underground piping as claimed in claim 1, further comprising positioning an end plate at said trailing larger diameter end of each of said second and subsequent unit pipes to facilitate movement of said first, second and subsequent unit pipes along the existing underground piping.

* * * * *